United States Patent [19]

Rollet

[11] Patent Number: 5,038,604

[45] Date of Patent: Aug. 13, 1991

[54] APPARATUS FOR MEASURING THE MASS-RELATED CHARACTERISTICS OF A BODY AND ITS APPLICATION TO THE MEASUREMENT OF THE CHARACTERISTICS OF A DRY SATELLITE

[75] Inventor: Robert Rollet, La Roquette sur Siagne, France

[73] Assignee: Aerospatiale Societe Nationale Industrielle, Paris, France

[21] Appl. No.: 350,586

[22] PCT Filed: Aug. 4, 1988

[86] PCT No.: PCT/FR88/00406

§ 371 Date: Mar. 27, 1989

§ 102(e) Date: Mar. 27, 1989

[87] PCT Pub. No.: WO89/01139

PCT Pub. Date: Feb. 9, 1989

[30] Foreign Application Priority Data

Aug. 5, 1987 [FR] France ................................. 87 11137

[51] Int. Cl.$^5$ ......................... G01M 1/10; G01M 1/12
[52] U.S. Cl. ........................................................ 73/65
[58] Field of Search ............................................ 73/65

[56] References Cited

U.S. PATENT DOCUMENTS 3,040,563  6/1962  Eckles et al. ............................ 73/65
3,418,847  12/1968  Nantz ...................................... 73/65

OTHER PUBLICATIONS

Articles Moments of Inertia and Mass Centre Coordinates Determn. Rig—Uses Period of Free Oscillations to Fix Moment of Inertia, CONS ROAD RES 03.02.83-SU-548506 CSRO S02 85-030064/05 SU 1097-899-A.

Primary Examiner—Charles A. Ruehl
Attorney, Agent, or Firm—Browdy and Neimark

[57] ABSTRACT

A measuring apparatus for determining the mass-related characteristics of a body has a base which supports a receiving table for the body mounted so as to oscillate about an approximately vertical axis on either side of an angular equilibrium position to which the table is returned elastically. The base and the table are provided with an angular position detector and blocking elements. The base is supported by a movable structure which rests on a stand and is mounted so as to oscillate about an adjustable horizontal axis which intersects said vertical axis at an adjustable height on either side of a stable angular equilibrium position. The base and the movable structure are provided with a system for detecting angular position and with means for adjusting the height of the instantaneous horizontal axis of oscillation. The apparatus also has means for positioning and blocking the body with respect to the movable structure.

21 Claims, 3 Drawing Sheets

APPARATUS FOR MEASURING THE MASS-RELATED CHARACTERISTICS OF A BODY AND ITS APPLICATION TO THE MEASUREMENT OF THE CHARACTERISTICS OF A DRY SATELLITE

The present invention concerns apparatus for determining the mass-related characteristics of a vertically disposed body such as an artificial satellite, for example, which is large, fragile and difficult to manipulate.

The methods of launching a satellite, placing it in orbit and positioning it in orbit require a knowledge of its mass, the position if its centre of gravity and its moments of inertia, these being generally referred to as its "mass-related characteristics". In practice these characteristics correspond to the satellite with its payload in a stowed configuration but without any fuel (hence "dry").

In the current state of the art these characteristics are each determined by means of a specific device which for the satellite as a whole multiplies the risk of damage due to handling and increases the duration and overall cost of the measurements.

In particular, the mass is often measured by weighing and the longitudinal moment of inertia is measured by placing the satellite vertically and centering it on a table mounted to oscillate about a vertical axis on a base resting on the ground. A device marketed by the SCHENCK company under the reference M7 may be used for this purpose. Measuring the transverse moments of inertia requires the satellite to be disposed horizontally using complex machinery with significant mass and inertia. The presence of this machinery during measurement of the transverse moments reduces the accuracy of the inertia measurements relative to a given transverse axis and reduces the number of measurement axes that can be used to two, which is insufficient for determining the transverse central inertia ellipse.

The present invention is directed to alleviating these disadvantages by making it possible to measure all the mass-related characteristics of a satellite or a like object in a constant single orientation, preferably a vertical disposition, with a single manipulation.

The measuring device in accordance with the present invention essentially comprises two superposed devices constituting oscillating free pendulums with respectively vertical and horizontal axes.

The invention proposes measuring apparatus for determining the mass, the position of the centre of gravity and the moments of inertia of a body held in a predetermined constant orientation, of the kind comprising, carried by a base, a receiving table for the body mounted to oscillate relative to a substantially vertical axis normal to the table to either side of a stable equilibrium angular position to which the table is returned elastically by return means, the table and the base being provided with a sensor for sensing the angular position of the table relative to the base and locking elements for locking the table to the base, characterised in that the base is carried by a movable structure carried by a stand and mounted to oscillate relative to a horizontal axis intersecting said vertical axis at a height adjustable to either side of a stable equilibrium angular position in which the normal axis of the table is vertical and towards which the mobile structure is returned elastically by second return means, the stand and the movable structure being provided with a system for sensing the angular position of the movable structure relative to the stand, locking elements for locking the movable structure relative to the stand in a stable equilibrium position and means for adjusting the height of the instantaneous horizontal oscillation axis, the apparatus being further provided with means for positioning and locking the body relative to the movable structure in a plurality of angular positions.

As will emerge hereinafter apparatus of this kind can be used, without any intermediate manipulation of the body, to measure its mass, to determine the position of its centre of gravity and to measure its longitudinal moment of inertia and its transverse moments of inertia.

The body is preferably mounted on the table so that one of its main axes of inertia is coincident with the axis normal to the table. The body is advantageously oriented vertically on the table.

The means for positioning and locking the body relative to the movable structure are advantageously separate from the means for locking the table relative to the base so that the latter can be designed to be operative only in the stable equilibrium configuration of the table relative to the base. This makes it possible to simplify the construction of these locking means and to avoid having to lock the table in a configuration in which the associated return spring means are asymmetrically loaded.

The means for locking the body relative to the movable structure advantageously comprise a ring rotatable about an axis coincident with the axis normal to the table and provided with temporary locking means. The ring may be disposed between the body and the table but is advantageously disposed between the base and the movable structure so that its inertia does not influence the inertia measurements which are made by oscillating the table relative to the base.

A compressed air system is advantageously provided for supporting the table on an air cushion when it oscillates relative to the base so as to reduce frictional damping of the oscillations.

The table is preferably mounted to oscillate on the base by means of a set of leaf springs disposed either perpendicularly (BENDIX arrangement) or radially and forming a virtual oscillation pivot and a return spring.

The BENDIX arrangement is known in known apparatus for measuring the longitudinal moment of inertia of satellites.

A periodmeter is advantageously associated with the position sensor linked to the table and to the base. This is sufficient for measuring the oscillation frequency given that the oscillation amplitude is not relevant to the computation of the moments of inertia. This applies also to the sensor for sensing the position of the movable structure relative to the stand; the sensors are advantageously of the contactless type.

Devices of any known type are provided for oscillating the table relative to the base and/or the fixed structure relative to the stand.

The movable structure preferably comprises a frame linked to the base, with the optional facility for the base to rotate relative to the frame by means of the aforementioned rotatable ring, resting on skids sliding on two plates linked to the stand and the orientation of which is controlled by an orientation control device. The skids are preferably two elongate shoes parallel to the horizontal oscillation axis and symmetrical relative to the table axis inserted in parallel grooves on the plates in which they are able to move transversely in the planes of the plates against return springs. The latter are preferably removable so that they can be replaced by other springs of different stiffness.

The frame is advantageously linked to the skids by articulations the axes of which are parallel to the horizontal oscillation axis and symmetrical relative to the table axis, which results in combined movement of the skids such that they have the same instantaneous oscillation amplitude.

The skids are preferably supported on air cushions in the grooves on the plates to reduce frictional damping of the oscillation amplitude.

The stable equilibrium positions of the skids on their plates are preferably symmetrical relative to a vertical plane containing the instantaneous horizontal oscillation axis, for reasons of balance.

The orientable plates are advantageously articulated to the stand about axes near the axes about which the skids are articulated to the frame. They are preferably provided with respective arms directed generally towards an inclination control device generally disposed in a vertical plane of symmetry parallel to the articulation axes, and which constitute the aforementioned height adjustment means for the instantaneous oscillation axis. There are preferably two such arms, one arm per plate, disposed in a vertical plane perpendicular to the articulation axes.

The arms preferably terminate near the vertical plane of symmetry in forks framing at least one horizontal finger parallel to the articulation axes and the height of which is controlled by a control piston-and-cylinder actuator which is part of the plate inclination control device. For example, this finger is linked to the piston of this actuator.

The orientation control device is preferably adapted to place the plates and therefore the skids in a common horizontal plane.

The invention is also concerned with the specific application of this apparatus to measurement of the mass-related characteristics of a satellite disposed vertically, provided with its payload in a stowed configuration but with no fuel.

With this apparatus there are preferably associated mass, moment of inertia and centre of gravity calibration bodies known per se for calibrating sensors or periodmeters so as to enable correction of the recorded measurement signals in order to deduce therefrom the mass-related characteristics of the body alone, eliminating the unwanted influence of moving parts of the apparatus (table, base, movable structure, rotating ring).

The apparatus is advantageously provided with an automatic control unit adapted to perform automatically complete measurement cycles for the mass-related characteristics of the body.

The following description given by way of non-limiting example only with reference to the appended drawings will explain how the invention may be implemented and used, and with what advantages. In the drawings.

Figure 1:
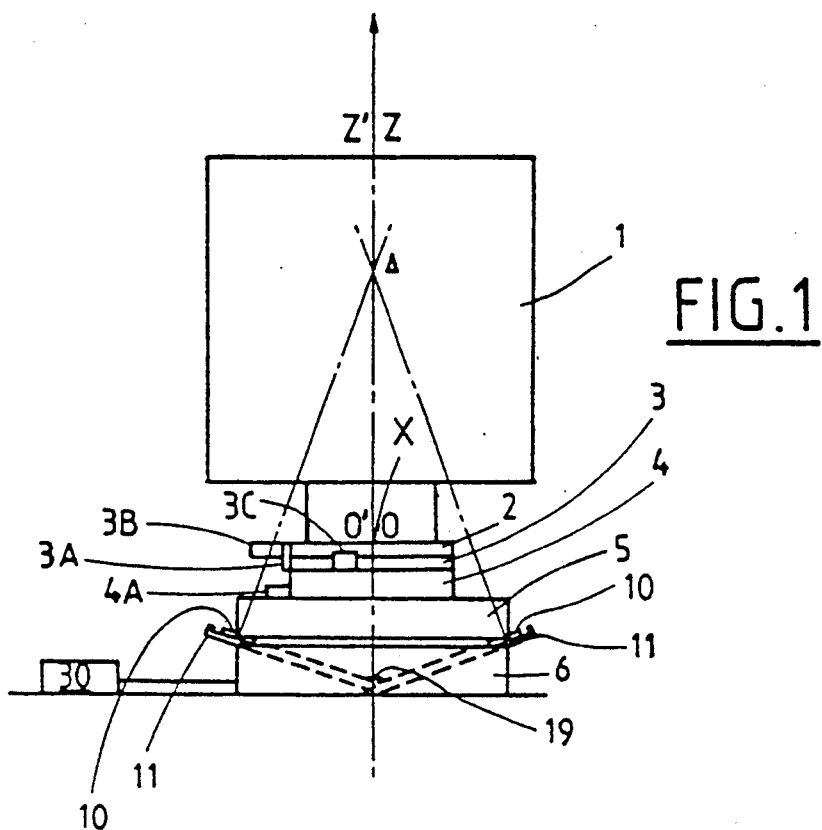
FIG. 1 is a schematic side view of apparatus in accordance with the present invention.
Figure 4:
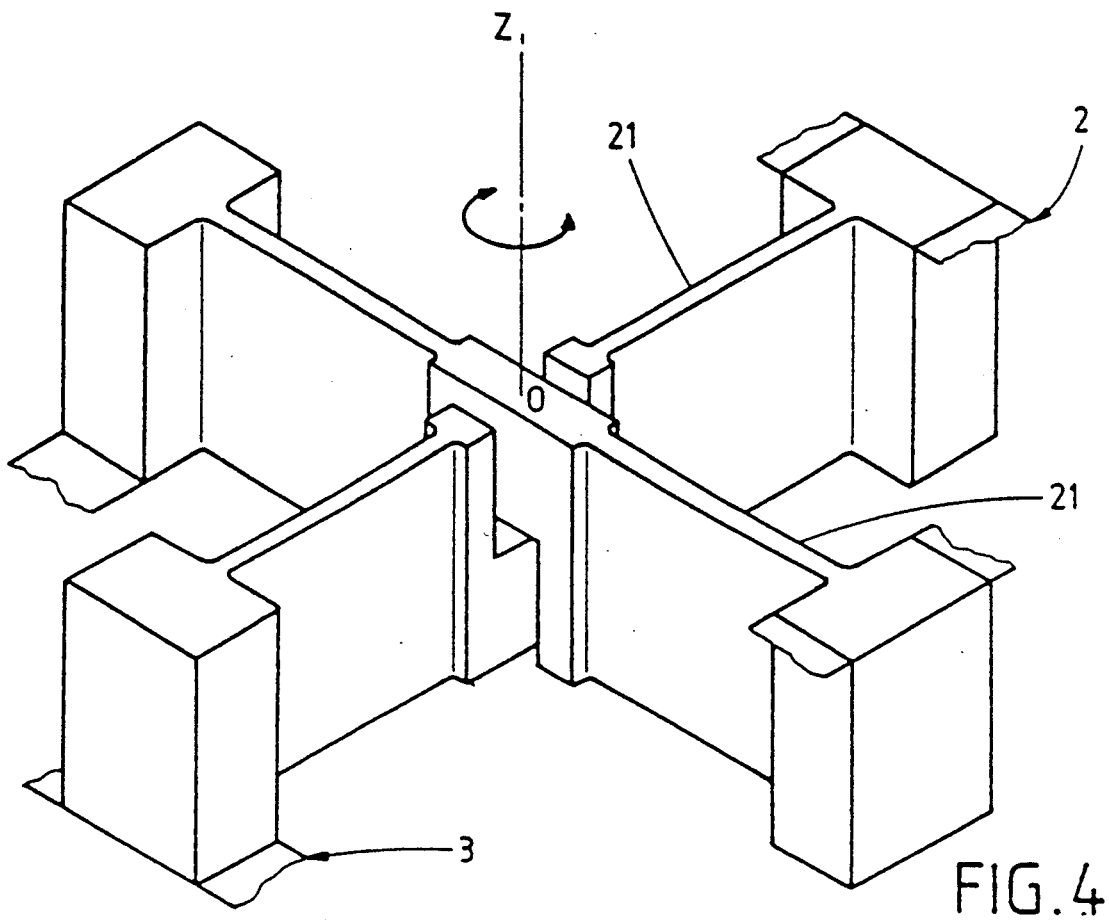
FIG. 4 is a perspective view of the virtual vertical pivot system for the vertical pendulum of the apparatus in a first embodiment.
Figure 5:
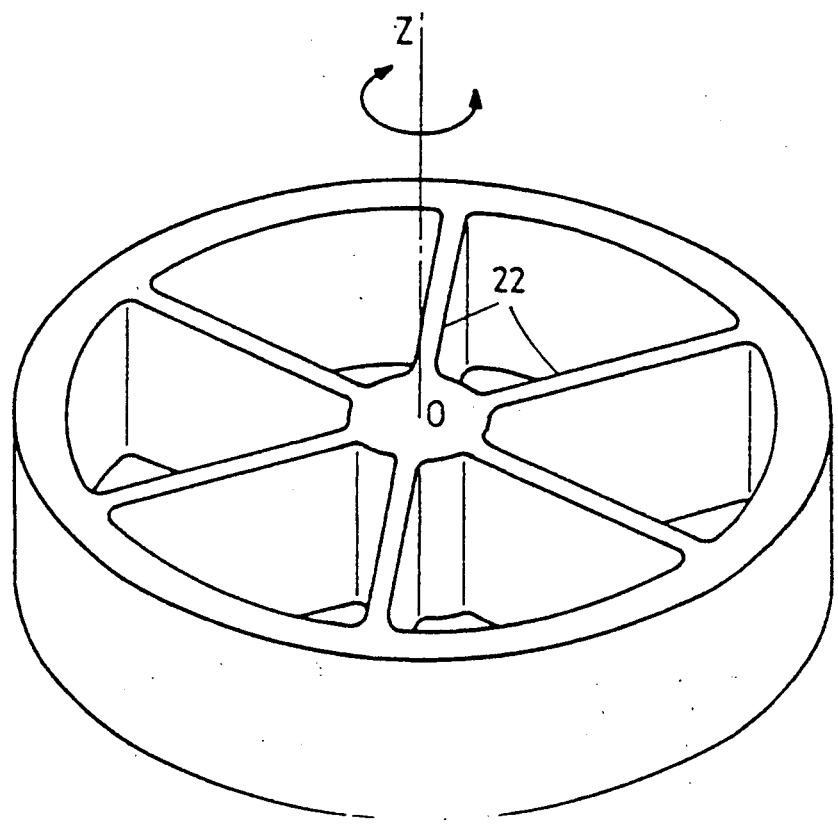
FIG. 5 is an analogous perspective view for a second embodiment.

Schematically represented in FIG. 1 is the body 1 to be measured (defined by a frame of reference comprising a main vertical inertia axis O'Z') fixed to a table 2 so that its axis O'Z' is coincident with an axis OZ normal to the receiving surface of the table. The table is linked to a base 3 so that it can oscillate freely about the axis OZ. In the conventional way this linking is provided by a system of leaf springs 21 or 22 disposed either perpendicularly (FIG. 4) or radially (FIG. 5) and serving both as a virtual pivot with the axis OZ and as a return spring.

Compressed air is injected between the table 2 and the base 3 by any known type means (not shown) to support the load (2+1) with very low friction between the parts 2 and 3.

Associated with the table and the base are an angular position sensor 3A and a periodmeter 3B transmitting signals representative of at least the oscillation frequency and an angular locking device 3C. These elements are of any appropriate known type.

The resulting free pendulum $(1+2)-3$ has a vertical axis and a period of oscillation which when measured and compared with that obtained with a calibration mass makes it possible to compute the moment of inertia of the body 1 relative to its axis O'Z'.

The base 3 is in turn linked to a rectangular frame (or movable structure) 5 by means of a ring 4 rotatable about an axis coincident with OZ and provided with means 4A for locking it temporarily relative to the frame 5; it may advantageously be supported by compressed air during its rotation.

A rectangular stand 6 rests on the ground. The frame 5 rests on the stand 6 through two supporting skids 10 which are elongate in the direction parallel to a horizontal axis OX of the stand and movable perpendicularly to the axis OX in grooves 11A formed in orientable plates 11 on which the skids slide perpendicularly to the axes OX and OZ supported on a film of compressed air 12 supplied by a system of pipes (not shown) connected at 13. Symmetrical sets of springs 14 disposed to either side of the skids in the plane in which they slide on the plates 11 return the skids 10 to a central position relative to the plates 11.

Contactless displacement sensors 20 and a periodmeter fixed to the plate 11 measure the instantaneous position of the skids 10 relative to the plates, perpendicularly to OX, in order to determine either the oscillation frequency of the body 1 or the static position of the body. The frame 5 can be locked relative to the stand by members 23 which in this instance are plates movable in the plane of the skids perpendicularly to OX and OZ.

The plates 11 are articulated about axes 15 fixed relative to the stand 6 and the skids 10 are articulated about axes 16 near the axes 15 and fixed relative to the frame 5. The axes 15 and 16 are parallel to the axis OX and are symmetrical relative to the vertical plane OXZ of the table 2.

Figure 2:
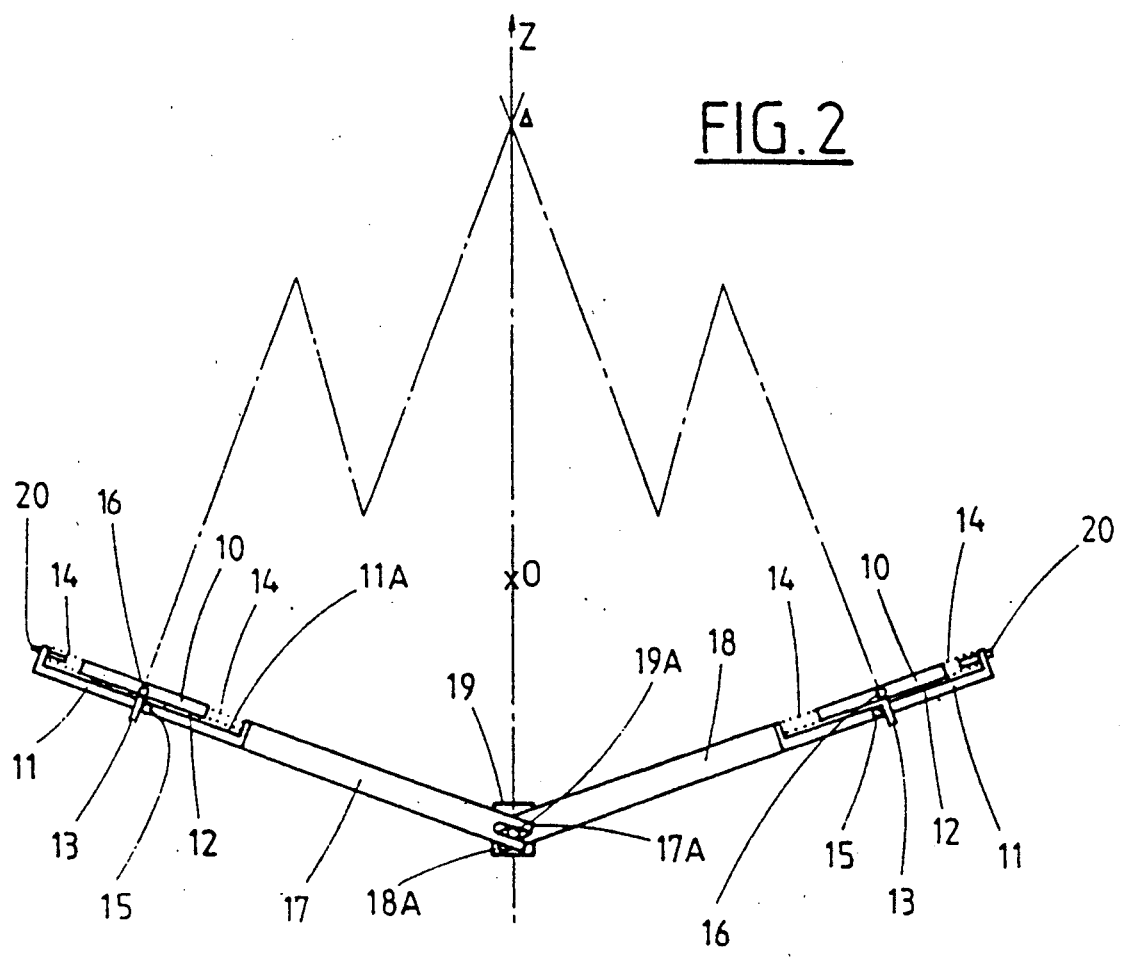
FIG. 2 is a detail view of the two air skids of the horizontal pendulum.
Figure 3:
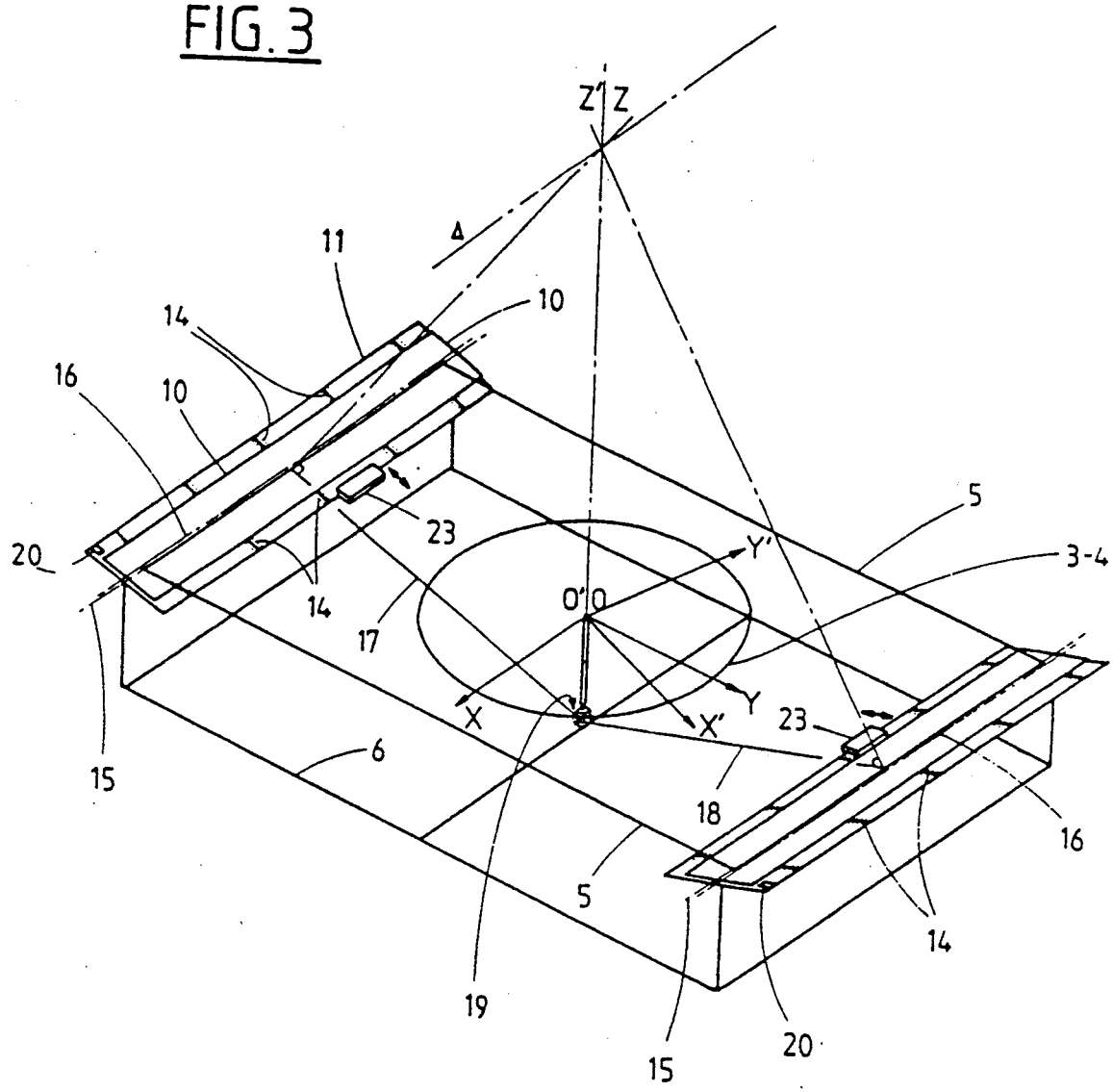
FIG. 3 is a perspective view of the horizontal pendulum.

The plates and therefore the skids can be simultaneously oriented symmetrically to the plane OXZ by means of a device comprising two arms 17 and 18 linked rigidly to the plates 11 and converging in the plane of FIG. 2 at a point situated on the axis OZ at a level which can be varied.

The arms 17 and 18 terminate near the axis OZ in forks 17A, 18A framing a finger 19A the height of which can be adjusted by means of a central vertical piston-and-cylinder actuator 19.

The straight line Δ defined by the intersection of the planes normal to the skids passing through the axes 15 constitutes the instantaneous rotation axis of the body 1 on oscillatory movement of the mobile parts 10 of the skids due to the action of the return force produced by the springs 14, the load being supported and guided laterally by the air film 12 to minimise friction.

Because the plates are oriented symmetrically relative to the plane XOZ this straight line intersects the axis OZ.

By measuring the period of the oscillatory movement it is possible to determine the moment of inertia of the body 1 relative to this straight line.

By modifying the orientation of the two air skids by means of the actuator 19 it is possible to move the axis Δ relative to the body 1 along the axis OZ and obtain a series of values of the moment of inertia of the body 1 and of the elements 2, 3, 4 and 5 relative to parallel axes. The minimum value of this moment of inertia corresponds to the axis passing through the centre of gravity of the combination 1+2+3+4+5 which, after correction, makes it possible to determine the Z coordinate of the centre of gravity of the body 1 alone.

By repeating the same measurements with the body 1 oriented differently relative to the axis OZ by means of the rotating ring 4 it is possible to determine the central transverse inertia ellipse.

By orienting the skids so that they are coplanar translation oscillations are obtained the period of which when compared with that obtained with a reference mass makes it possible to determine the mass of the body 1 after deducting the mass of the elements 2, 3, 4 and 5.

Measuring the equilibrium position of the body 1 for different angular positions of the body 1 about OZ obtained by means of the rotating ring 4 makes it possible to determine the x, y and z coordinates of the centre of gravity of the body 1. The x and y coordinates may be cancelled out by adding static balancing masses fixed to the body 1.

The various functions of the apparatus:
operation and position sensing of the actuator 19;
rotation and position sensing of the rotating ring 4;

| air supply launching period measurement mechanical locking | for the vertical pendulum, |
|---|---|
| air supply launching period measurement static position measurement mechanical locking sundry computations | for the horizontal pendulum, | can be managed in any appropriate manner by a computer 30 making it possible to automate the measurement of the mass-related characteristics of any object. The software for this computer is readily deduced from the explanations given hereinabove.

I claim:

1. Measuring apparatus for determining the mass, the position of the centre of gravity and the moments of inertia of a body (1) held in a predetermined constant orientation, of the kind comprising, carried by a base (3), a receiving table (2) for the body mounted to oscillate relative to a substantially vertical axis normal to the table to either side of a stable equilibrium angular position to which the table is returned elastically by first elastic return means (21, 22), the table and the base being provided with a position sensor (3A) for sensing the angular position of the table relative to the base and locking elements (3C) for locking the table to the base, characterised in that the base (3) is carried by a movable structure (5) carried by a stand (6) and mounted to oscillate relative to a horizontal axis intersecting said vertical axis at a height adjustable to either side of a stable equilibrium angular position in which the normal axis of the table is vertical and towards which the mobile structure is returned elastically by second elastic return means (14), the stand and the movable structure being provided with a system (20) for sensing the angular position of the movable structure (5) relative to the stand (6), locking elements (23) for locking the movable structure relative to the stand in a stable equilibrium position and axis adjusting means (19) for adjusting the height of the instantaneous horizontal oscillation axis (Δ), the apparatus being further provided with means (4, 4A) for positioning and locking the body relative to the movable structure in a plurality of angular positions.

2. Apparatus according to claim 1 characterised in that the means (4, 4A) for positioning and locking the body relative to the movable structure are separate from the locking elements (3C) for locking the table to the base.

3. Apparatus according to claim 2 characterised in that the means (4, 4A) for positioning and locking the body relative to the movable structure comprise a ring (4) rotatable about an axis coincident with the axis normal to the table and provided with temporary locking members (4A).

4. Apparatus according to claim 3 characterised in that the ring (4) is disposed between the base (3) and the movable structure (5).

5. Apparatus according to claim 1 characterised in that air cushion means are provided for supporting the table when it oscillates relative to the base.

6. Apparatus according to claim 1, characterised in that the table is mounted to oscillate on the base by means of said first elastic return means which comprise a set of leaf springs (21) disposed perpendicularly or radially and forming a virtual oscillation pivot and a return spring.

7. Apparatus according to claim 1 characterised in that a periodmeter (3B) is associated with the position sensor (3A) linked to the table (2) and to the base (3).

8. Apparatus according to claim 1, characterised in that the movable structure comprises a frame (5) linked to the base and resting on skids (10) sliding on two plates (11) linked to the stand (6) and adapted to be oriented by a plate orientation control device (19) being part of said axis adjusting means.

9. Apparatus according to claim 8 characterised in that the skids (10) are two elongate shoes parallel to the horizontal oscillation axis (Δ) and symmetrical relative to the axis (OZ) of the tables inserted in parallel grooves on the plates in which they are able to move transversely in the planes of the plates against said second elastic return means (14).

10. Apparatus according to claim 8 characterised in that the frame (5) is linked to the skids (10) by articulations (16) the axes of which are parallel to the horizontal oscillation axis and symmetrical relative to the table axis.

11. Apparatus according to claim 10 characterised in that the orientable plates (11) are articulated to the stand (6) about articulation axes (15) near the articulation axes (16) by which the skids are articulated to the frame (5).

12. Apparatus according to claim 11 characterised in that the plates are provided with respective arms generally directed towards said plate orientation control device (19) which is generally disposed in a vertical plane of symmetry parallel to the articulation axes.

13. Apparatus according to claim 12 characterised in that there are two such arms (17, 18), one arm per plate, disposed in a vertical plane perpendicular to the articulation axes.

14. Apparatus according to claim 12 characterised in that the arms terminate near the vertical plane of symmetry in forks (17A, 18A) framing at least one horizontal finger (19A) parallel to the articulation axes the height of which is controlled by a control piston-and-cylinder actuator being part of said plate orientation control device.

15. Apparatus according to claim 14 characterised in that the finger (19A) is linked to the actuator.

16. Apparatus according to claim 8 characterised in that the skids (10) are supported on air cushion (12) in grooves on the plates.

17. Apparatus according to claim 8 characterised in that the skids have stable equilibrium positions on their plates which are symmetrical relative to a vertical plane containing the instantaneous horizontal oscillation axis.

18. Apparatus according to claim 8 characterised in that the plate orientation control device skids in a common horizontal plane.

19. Apparatus according to claim 1 characterised in that a periodmeter (3B) is associated with the position sensor (3A) linked to the table (2) and to the base (3).

20. Apparatus according to claim 1 characterised in that it is provided with an automatic control and monitoring unit (30) adapted to perform automatically complete cycles for measuring the mass-related characteristics of the body.

21. Application of apparatus according to claim 1 to measuring the mass-related characteristics of a dry satellite (1) disposed vertically so that its main longitudinal axis of inertia is coincident with the axis normal to the table.

* * * * *